United States Patent
Warsinger et al.

(10) Patent No.: US 12,404,187 B2
(45) Date of Patent: Sep. 2, 2025

(54) DOUBLE-ACTING PISTON BATCH REVERSE OSMOSIS DESALINATION ASSEMBLY AND METHOD

(71) Applicants: Purdue Research Foundation, West Lafayette, IN (US); David Warsinger, West Lafayette, IN (US); Sandra Cordoba, West Lafayette, IN (US); Abhimanyu Das, West Lafayette, IN (US)

(72) Inventors: David Warsinger, West Lafayette, IN (US); Sandra Cordoba, West Lafayette, IN (US); Abhimanyu Das, Sunnyvale, CA (US)

(73) Assignee: Purdue Research Foundation, West Lafayette, IN (US)

( * ) Notice: Subject to any disclaimer, the term of this patent is extended or adjusted under 35 U.S.C. 154(b) by 587 days.

(21) Appl. No.: 17/764,527

(22) PCT Filed: Sep. 30, 2020

(86) PCT No.: PCT/US2020/053473
§ 371 (c)(1),
(2) Date: Mar. 28, 2022

(87) PCT Pub. No.: WO2021/067397
PCT Pub. Date: Apr. 8, 2021

(65) Prior Publication Data
US 2022/0340453 A1 Oct. 27, 2022

Related U.S. Application Data

(60) Provisional application No. 62/908,698, filed on Oct. 1, 2019.

(51) Int. Cl.
C02F 1/44 (2023.01)
C02F 1/00 (2023.01)
C02F 103/08 (2006.01)

(52) U.S. Cl.
CPC .............. C02F 1/441 (2013.01); C02F 1/008 (2013.01); *B01D 2313/36* (2013.01);
(Continued)

(58) Field of Classification Search
CPC ...... C02F 1/441; C02F 1/008; C02F 2103/08; C02F 2201/005; C02F 2201/009;
(Continued)

(56) References Cited

U.S. PATENT DOCUMENTS 8,808,538 B2 8/2014 Oklejas, Jr.
2019/0160431 A1* 5/2019 Warsinger ............ B01D 61/025
2019/0184339 A1* 6/2019 Oklejas, Jr. ............ C02F 1/265

FOREIGN PATENT DOCUMENTS

CN 109205736 1/2019

OTHER PUBLICATIONS

Dydek et al., Nonlinear dynamics of ion concentration polarization in porous media: The leaky membrane model, American Institute of Chemical Engineers Journal, vol. 59, No. 9, Sep. 2013 [retrieved on Dec. 4, 2020]. Retrieved from the Internet: . Pas. 3539-3555 (Year: 2013).*

(Continued)

*Primary Examiner* — Madeline Gonzalez
(74) *Attorney, Agent, or Firm* — David E. Novak; Brannon Sowers & Cracraft PC

(57) ABSTRACT

An assembly for reverse osmotically desalinating water, including a source containing feed water to be desalinated, a high-pressure tank having a first portion and a second portion and a movable piston wall operationally connected
(Continued)

therebetween, a first portion inlet operationally connected to the first portion and a second portion inlet operationally connected to the second portion, a first portion outlet operationally connected to the first portion and a second portion outlet operationally connected to the second portion, a first valve having a first first valve inlet, a second first valve inlet, a first first valve outlet in fluidic communication with the first portion inlet and a second first valve outlet in fluidic communication with the second portion inlet, a high-pressure pump operationally connected to the source and to the first first valve inlet, a second valve having a first second valve inlet in fluidic communication with the first portion outlet and a second second valve inlet in fluidic communication with the second portion outlet and a second valve outlet, at least one reverse osmosis module having at least one reverse osmosis module inlet connected in fluidic communication with the second valve outlet, at least one brine outlet and at least one desalinated water outlet, a circulation pump having a circulation pump inlet port connected in fluidic communication with the brine outlet and a circulation pump outlet connected in fluidic communication with the second first valve inlet, and an electronic controller operationally connected to the first valve, to the second valve, to the high-pressure pump and to the circulation pump.

10 Claims, 9 Drawing Sheets

(52) U.S. Cl.
CPC .... *C02F 2103/08* (2013.01); *C02F 2201/005* (2013.01); *C02F 2201/009* (2013.01); *C02F 2209/03* (2013.01); *C02F 2209/05* (2013.01)

(58) Field of Classification Search
CPC .............. C02F 2209/03; C02F 2209/05; C02F 2301/046; B01D 2313/36; B01D 2313/246; B01D 61/06; B01D 61/025; B01D 61/12; Y02A 20/131; Y02A 20/212; Y02W 10/37
USPC ... 210/652, 416.1, 98, 143, 191, 195.1, 252, 210/257.1, 257.2, 258, 10, 3, 321.6
See application file for complete search history.

(56) References Cited

OTHER PUBLICATIONS

Dydek et al., Nonlinear dynamics of ion concentration polarization in porous media; The leaky membrane model, American Institute of Chemical Engineers Journal, vol. 59, No. 9, Sep. 2013 [retrieved on Dec. 4, 2020]. Retrieved from the Internet: <URL: http://web.mit.edu/bazant/www/papers/pdf/Dydek_2013_LMM.pdf>. pp. 3539-3555.

Wei et al., Batch reverse osmosis: experimental results, model validation, and design implications, 2019 AMTA/AWWA Membrane Technology Conference & Exposition, New Orleans, Louisiana, American Membrane Technology Association, Feb. 2019 [retrieved on Dec. 4, 2020]. Retrieved from the Internet: <URL: https://dspace.mit.edu/bitstream/handle/1721.1/121019/WEI-paperMTC-final.pdf?>. pp. 1-14.

Cordoba et al., Improved batch reverse osmosis configuration for better energy efficiency, IDA 2019 World Congress World Congress on Water Reuse and Desalination, Dubai, UAE, Oct. 24, 2019 [retrieved on Dec. 4, 2020]. Retrieved from the Internet: <URL: https://docs.lib.purdue.edu/cgi/viewcontent.cgi?article=1025&context=mepubs>. Entire document.

* cited by examiner

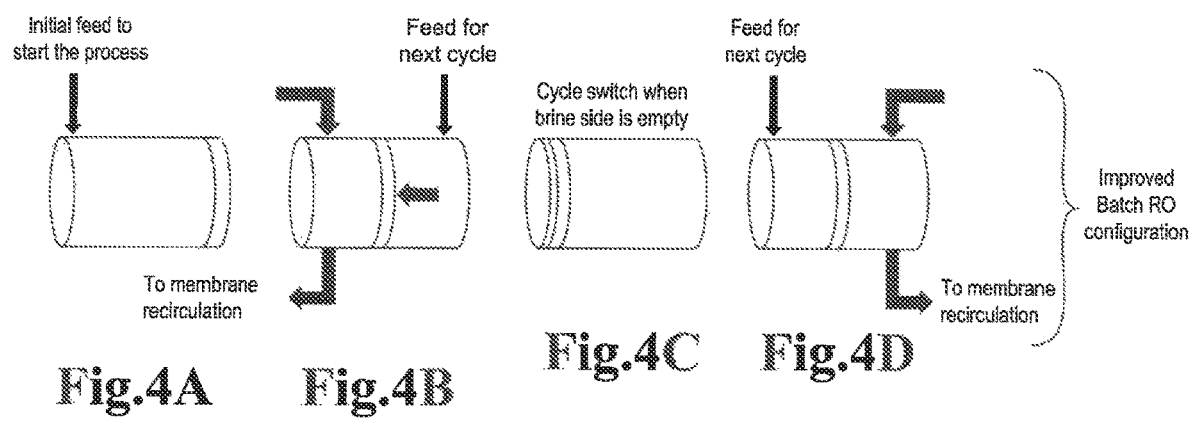
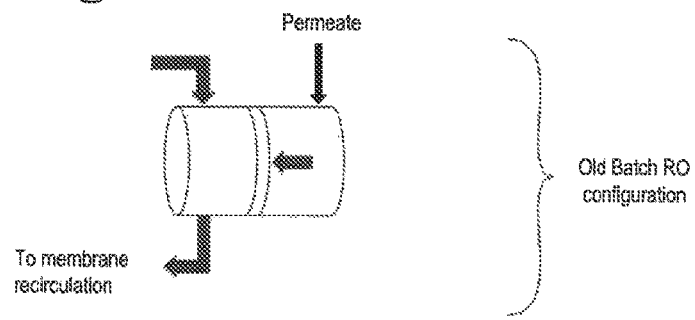
Fig.4A Fig.4B Fig.4C Fig.4D Fig.4E

DOUBLE-ACTING PISTON BATCH REVERSE OSMOSIS DESALINATION ASSEMBLY AND METHOD

CROSS-REFERENCE TO RELATED APPLICATIONS

This patent application claims priority to U.S. Provisional Patent Application Ser. No. 62/908,698 filed on Oct. 1, 2019.

TECHNICAL FIELD

The novel technology herein relates generally to chemical engineering and, more particularly, to reverse osmosis desalination techniques.

BACKGROUND

Recent progress in batch and semi-batch reverse osmosis (RO) processes such as closed-circuit reverse osmosis (CCRO) have shown promise to be quite efficient desalination systems. Despite their progress, there is still ample room for improved performance of reverse-osmosis water recovery systems. Increased efficiency and reduced downtime between cycles both would improve cost performance, and should be optimized for the RO process.

Reverse osmosis desalination technology was initially developed in the late 1950s, and has since evolved into the leading desalination technology globally, accounting for almost 70% of the total installed capacity around the world. However, even though the RO desalination technology has proved its effectiveness and capabilities to treat saline water and take it to required concentration levels for different industries and processes, the elevated energy consumption per every cubic meter of permeate produced is still a main concern. As shown in FIG. 1, energy consumption for sea water reverse osmosis plants has steadily decreased over the last 40 years as better membranes, more efficient pumps, and energy recovery devices have been implemented. Although energy consumption of the RO process has decayed remarkably, the energy consumption of the RO process currently remains far from minimized. Moreover, most of the desalination plants around the world work under the continuous reverse osmosis configuration in which although the feed osmotic pressure may be relatively low and the entire feed stream must be pressurized to overcome the brine osmotic pressure at the system exit.

In a batch RO process, desalination occurs wherein a set quantity of feed solution is concentrated over time up to the required final brine salinity and this process is repeated to produce large amounts of permeate. Batch RO is a transient process in which the brine exiting the RO module is recirculated back to the feed side without any mixing with fresh feed. The desalination process is extended in time rather than space with a small module recovery ratio per pass. As a result, the exerted hydraulic pressure follows the osmotic pressure of the brine over time leading to significant energy savings as compared to a single stage conventional RO process. FIG. 2 shows the required pressure to be applied in a reverse osmosis plant working under continuous and batch configuration with an inlet feed salinity of 3 [g/Kg]. In the continuous case, the applied pressure remains constant over time regardless the recovery ratio that has been reached whereas in batch reverse osmosis the recovery ratio increases, and as a consequence the concentration in the inlet feed the applied pressure is augmented. The graph can be considered to illustrate the energy savings related with using a batch process over a continuous configuration.

Thus, there remains a need for an improved RO desalination process having increased cost and energy efficiency. The present novel technology addresses this need.

BRIEF DESCRIPTION OF THE DRAWINGS

FIG. 4A-4E schematically illustrates the high-pressure tank of FIG. 3A over the course of a cycle.

DETAILED DESCRIPTION

Figure 1:
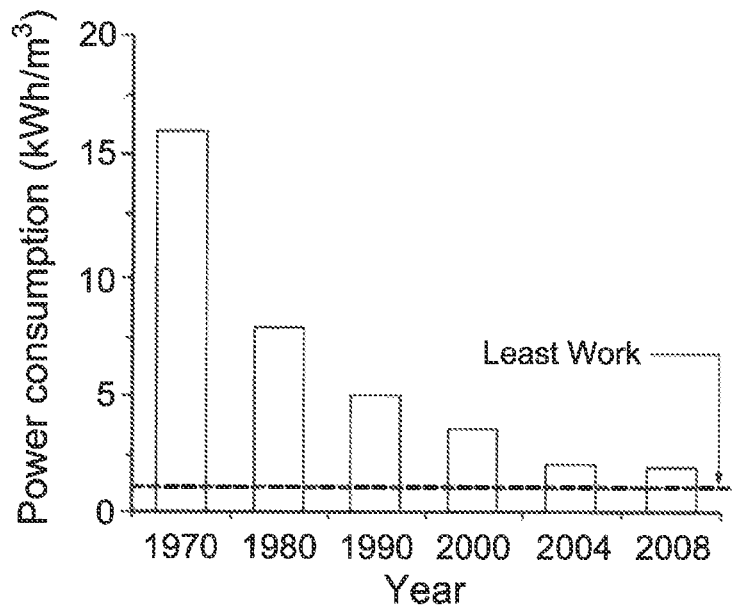
FIG. 1 graphically illustrates change in energy consumption at saltwater reverse osmosis plants from 1970 to 2008.
Figure 2:
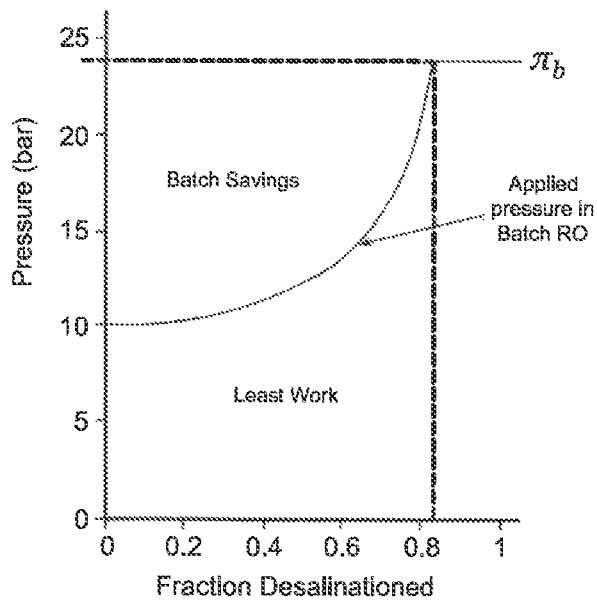
FIG. 2 graphically illustrates applied pressure as a function of recovery rate for continuous and batch reverse osmosis processes of the prior art.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIGS. 3-9, the present novel technology relates to a quasi-batch RO desalination system wherein a high pressure, variable-volume piston-like tank is used to accommodate the exiting brine and the permeate produced in each cycle. The piston-like tank represents an improved reverse osmosis configuration to overcome the current limitations associated with the practical implementation of the high-pressure tank batch reverse osmosis configuration. The high-pressure tank acts as a reciprocating piston. A high-pressure pump operationally connected to the tank fills the inactive side with the following cycle's feedwater, providing two main benefits. First, no tank emptying step is needed because feed is already present, thus reducing downtime. Second, the tank fully empties each cycle, thus avoiding the small energy losses from brine mixing with the new feed that detracted from past best designs. The modeling methodology is the most thorough yet for batch processes, as it uses a discretized module that includes transient mass transport equations for salt boundary layers, membrane permeability effects, and minute salt permeation through the membrane. Comparing the instant configuration to standard reverse osmosis with and without energy recovery, the new process is more efficient and has the potential to be below 2 kWh/m3 for seawater. The instant process also benefits from decreased downtime, around 2% of cycle time as compared with 10% for CCRO.

Figure 3A:
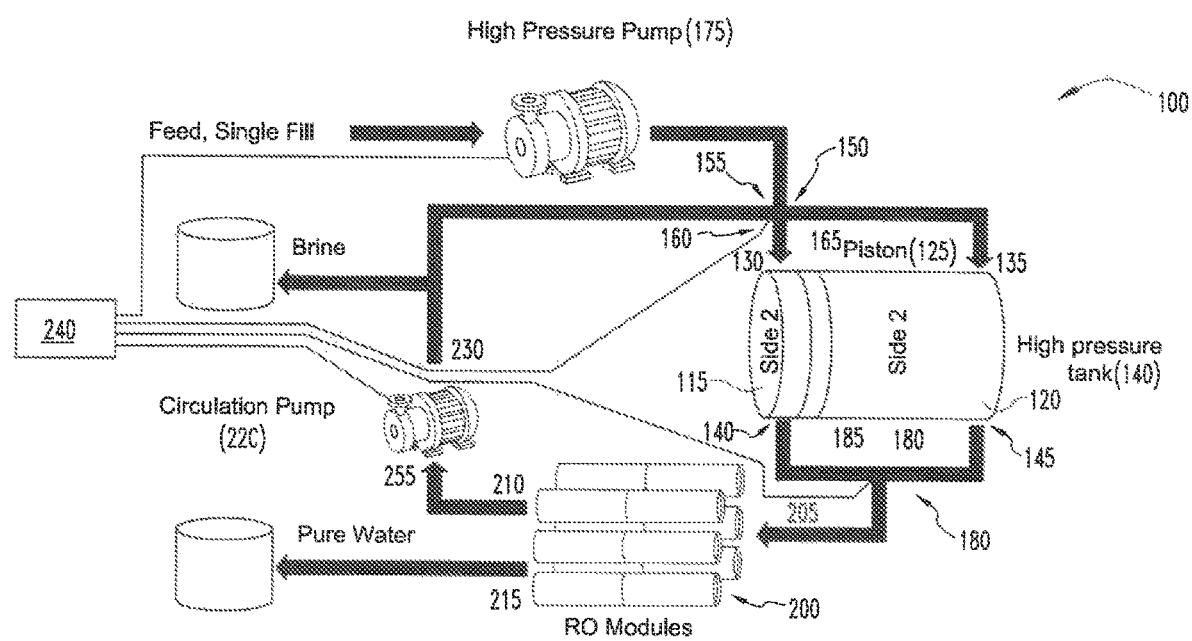
FIG. 3A schematically illustrates a batch reverse osmosis system of the present novel technology using a reciprocating high-pressure tank.
Figure 3B:
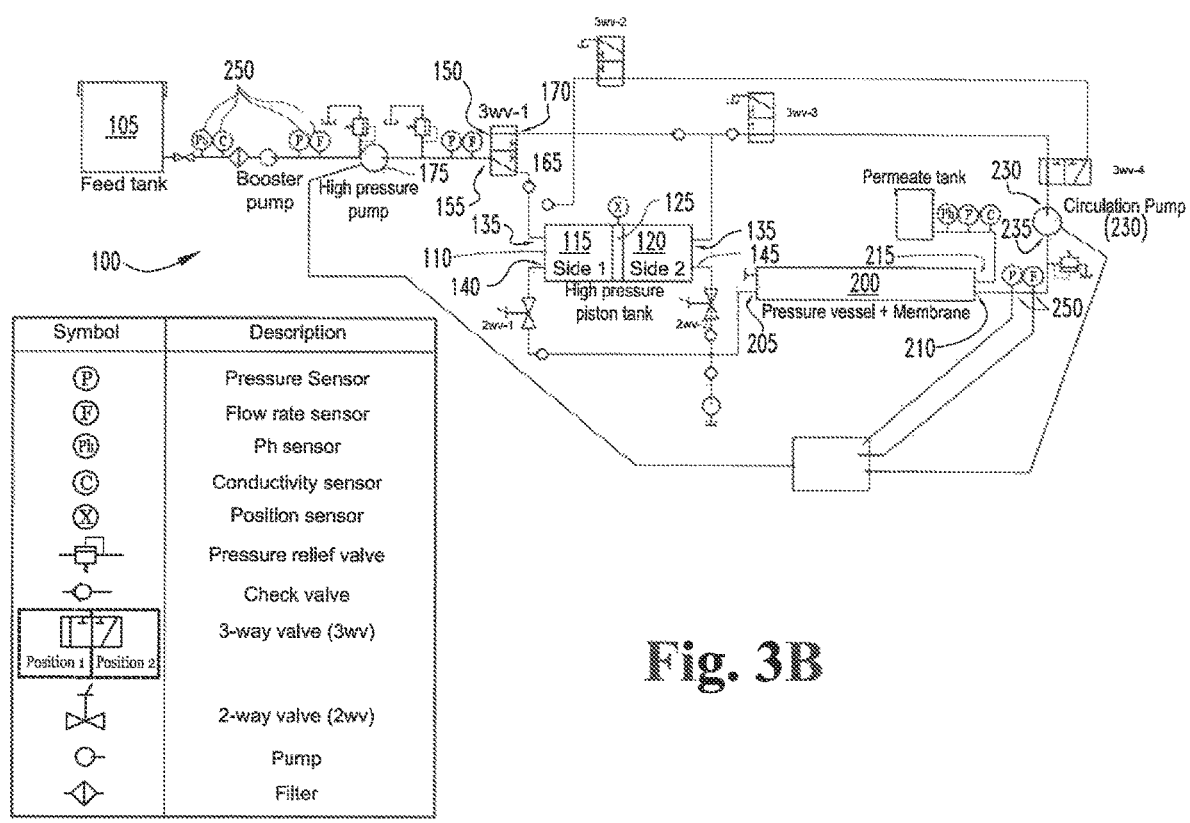
FIG. 3B diagrammatically illustrates the system of FIG. 3A.

FIGS. 3A and 3B schematically illustrates the more efficient batch RO process associated with the above-described assembly 100. The process is divided in different steps as discussed below. The high-pressure tank enables pressure ramping without losses, as both sides of the tank are used for the feed and brine, in an alternating fashion. In batch RO, concentrating feed recirculates in the main flow loop, enabled by a circulation pump with small ΔP. Feed added to the system (through a high-pressure pump that ramps up pressure to follow osmotic pressure) displaces volume on the non-active side, allowing permeate production while maintaining high pressure. Here brine empties at the beginning of each cycle, with minimal pausing the cycle before emptying. FIG. 3B further schematically illustrates the valving and sensors typically employed to govern the batch RO assembly, with the sensors, valves, and pumps connected in electric communication with an electronic controller programmed to run the assembly according to predetermined process steps.

FIG. 4 illustrates the process steps as described below:

Step 0: During the first step of the cycle the high-pressure pump is used to send feed to the side number 1 of the high-pressure tank. This step occurs only one time and is used to initially charge the system with feed.

Step 1: In step number 1, the high-pressure pump will send feed to the side number 2 of the high-pressure tank and this fluid will be used to push the initial feed in the side number 1 through the RO modules. After the split process occurs in the modules the pure water will be collected in a different location and the produced brine will be returned to the side number 1 of the high-pressure tank using the circulation pump.

Step 2: The moment when the piston reaches the end of the high-pressure tank is the signal to finish step 1 and a quick flushing stage is initiated. A valve closes the recirculation loop, and the circulation pump empties the brine in the pipes and replaces it with feed. Meanwhile, the high-pressure pump will continue to send feed to the RO modules, produces permeate in a pulse-flow like configuration. Then the module empties into the flow loop at high pressure, where valves again reduce the pressure to replace the brine with feed. After this stage the system is ready to enter in a water production phase again using the feed in the side number 1 of the high-pressure tank.

FIG. 4 also illustrates the prior art RO design for ease of comparison. Instead of using both sides to produce fresh water, one side was being filled by the permeate causing contamination issues with the fresh water and the brine. Moreover, the downtime in the system during the flushing step is higher because the system needs to be recharged again, unlike the new configuration where these concerns were solved.

The instant batch RO configuration enjoys the following efficiency advantages over the known prior art systems:

Downtime arising from the requisite flushing step is reduced substantially, because only the leftover brine in the pipes and in the module needs be removed and on the other hand, it is not necessary to recharge the system as the feed send to the opposite side of the high pressure tank is used in the next step to produce permeate water.

The entropy generation in the instant assembly is reduced in comparison with the previous design as mixing between the incoming feed and the remaining brine in the system is avoided. This is because no brine remains in the tank when a cycle is ended.

The permeate will does not contact either the initial feed or the brine.

The transient mass conservation and transport equations for the above batch RO processes are given below. The RO module is broken up into a plurality of discretized slices to account for the concentration boundary and flux in effectively 2D detail. In order to more accurately estimate energy efficiency, realistic pump efficiencies are used for the high-pressure pump as well as the circulation pump and realistic pressure drops are calculated. The temporal and spatial variation of salinity in the feed and permeate channels are captured by solving the unsteady mass conservation equations for both water and salt. Unsteady concentration polarization effects have also been captured by solving the transient transport equation for flow across the membrane. Boundary layer thickness on either side of the membrane is obtained by using mass transfer correlations that can incorporate the effect spacers in the channels. Pressure drop in the flow channels is obtained using Darcy's law that depends on the Reynolds number of the flow. Local density variations with salinity have also been included in the conservation equations.

Figure 5:
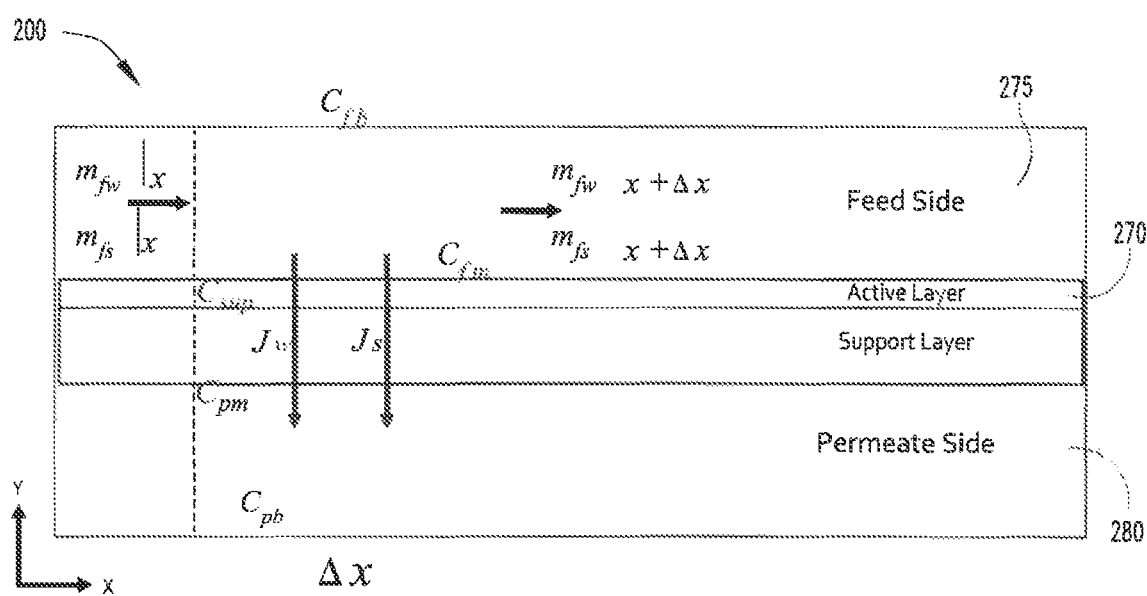
FIG. 5 graphically illustrates the interior of a reverse osmosis module of FIG. 3A.

The subscript i is used to denote the $i^{th}$ discretized control volume, as shown in FIG. 5, along the longitudinal flow direction with respect to the membrane and assuming a salinity invariant membrane permeability coefficient, A, the transmembrane water flux for the can be written as:

$$J_{w,i} = A(\Delta P_i - \Delta \pi_i) \quad (1)$$

where $\Delta P_i$ and $\Delta \pi_i$ are respectively the hydraulic and osmotic pressure differences across the RO membrane. The osmotic pressure difference, $\Delta \pi_i$, across the membrane depends on the salt concentration difference across the active layer of the membrane is given by $$\Delta C_{m,i} = C_{fm,i} - C_{sup,i} \quad (2)$$

where $C_{m,i}$ is the salt concentration at the membrane surface on the feed side of the RO module, while $C_{sup,i}$ is the salt concentration at the interface between the active layer and the support layer. The value of $C_{fm,i}$ is higher than the bulk value of salt concentration on the feed side, $C_{fb,i}$ while that of $C_{sup,i}$ is lower than bulk value on the permeate side, $C_{pb,i}$. The values of $C_{fm,i}$ and $C_{sup,i}$ depend on the bulk concentration values, the thickness, tortuosity and porosity of the membrane support layer and the flow velocity over the membrane surface dictating the concentration boundary layer thickness on either side of the membrane as well as the water flux, $J_{w,i}$. $\Delta C_{m,i}$ can be calculated by solving the transient transport equation for different domains along the transmembrane direction, y which be written as:

$$\frac{\partial C_i(y)}{\partial t} + J_w \frac{\partial C_i(y)}{\partial y} = D_{eff} \frac{\partial^2 C_i(y)}{\partial y^2} \quad (3)$$

where, $C_i(y)$ is the transmembrane salt concentration, y and $D_{eff}$ is the effective binary diffusion coefficient of salt in water. In solving (3), we ignore the small temporal and spatial variation of density as well as water flux across the membrane to reduce the complexity of the model. The boundary conditions for (3) depend on the transmembrane salt flux, $J_{s,i}$. Most membranes do not have a 100% salt rejection rate and hence the permeate should be expected to have a small salinity owing due to $J_{s,i}$. Moreover, if we assume a constant salt permeability coefficient, B, for a membrane, $J_{s,i}$, the transmembrane salt flux, may be written as $$J_{s,i} = B \Delta C_{m,i} \quad (4)$$

Bulk values of salt concentration in the feed and permeate channels of the module can be obtained by solving the transient mass conservation equations for water and salt for control volumes on either side of the membrane which can be written as $$A_f \Delta x \frac{\partial \rho_{f,avg,i}(1 - C_{f,avg,i})}{\partial t} = m_{f,w,i} - m_{f,w,i+1} - J_{w,i} \Delta A \rho_w \quad (5)$$

$$A_f \Delta x \frac{\partial \rho_{f,avg,i} C_{f,avg,i}}{\partial t} = \frac{m_{f,w,i} C_{f,i}}{1 - C_{f,i}} - \frac{m_{f,w,i+1} C_{f,i+1}}{1 - C_{f,i+1}} - J_{s,i} \Delta A \quad (6)$$

where the subscript f denotes the feed side, $A_f$ is the channel cross-sectional flow area, $\Delta x$ is the length of each control volume, and $\rho_{f,avg,i}$ and $C_{f,avg,i}$ are the average bulk solution density and concentration in the control volume. $m_{f,w,i}$ and $C_{f,i}$, and $m_{f,w,i+1}$ and $C_{f,i+1}$ are the water flow rate and bulk concentration of the steams entering and leaving the $i^{th}$ control volume, while $J_{w,i}$ and $J_{s,i}$ are the water and salt fluxes leaving the same control volume. $\Delta A$ is the differential membrane area for transmembrane transport while $\rho_w$ and $\rho_s$ are the densities of water and salt. Similar equations can be constructed for flow on the permeate side as well with the salt and water fluxes entering the control volume.

Figures 6A, 6B, 6C:
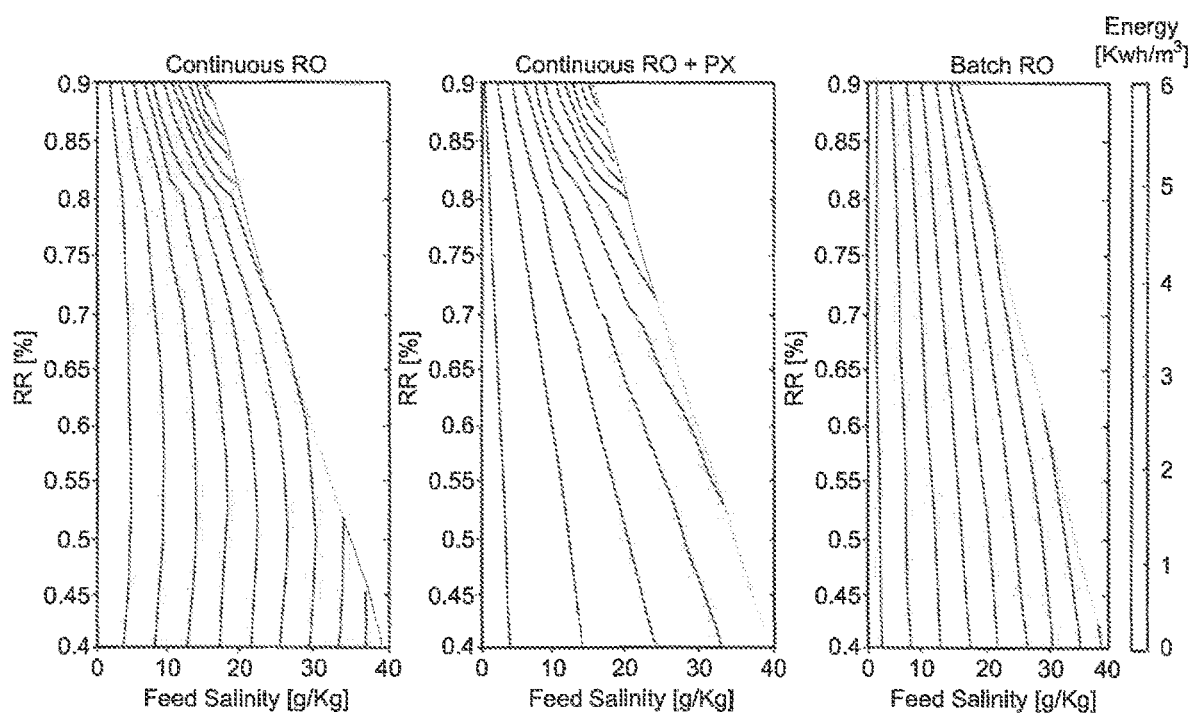
FIG. 6 maps specific energy as a function of feed salinity for various system configurations.
Figure 7:
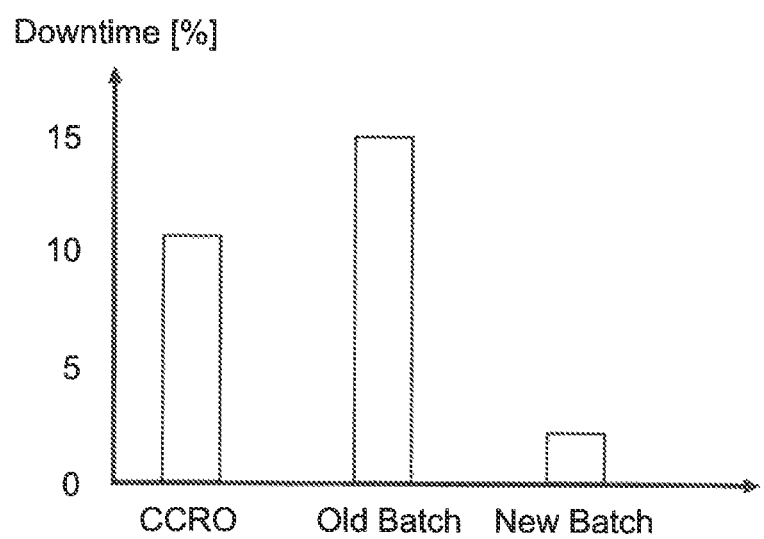
FIG. 7 graphically illustrates downtime for several RO system configurations.

As can be seen in FIG. 6, the specific energy consumption of the batch RO, continuous reverse osmosis and continuous reverse osmosis with a pressure exchanger was plotted for a wide range of initial concentrations and final recovery ratio (RR). It can be observed how the batch RO configuration substantially outperforms the performance of its competitors having very low specific energy consumptions compared with the other arrangements under the same initial conditions. FIG. 7 shows the downtime percentage for different batch or semi-batch RO configurations with respect to the total cycle time. It can be seen how the downtime in the new configuration is less than the time spent in the flushing step in the old configuration. The new design in its simplest operation can achieve 10% downtime, but with steps to use valves to replace the feed and module water, downtown may be substantially decreased.

The volume of the high-pressure piston tank is sized according to the volume of the pipes and the membrane module in the system, as follows:

$$\frac{V_m + V_{pipes}}{V_t} = \frac{1 - RR}{RR} \quad (7)$$

Where $V_m$ represents the volume of the membrane module, $V_{pipes}$ the volume of the pipes in the high pressure circuit of the system, $V_t$ the volume of the high pressure piston tank and RR is the recovery ratio of the batch RO stage. The high-pressure piston tank is manufactured following the guidelines established for high pressure vessels. The high-pressure piston tank has an effective sealing within the piston. The high-pressure piston tank is typically cylindrical with four ports that may be taken in and out of operation.

Regarding the places in the system where sensors or gauges are located, manifolds are used to accommodate as many electronic devices as possible, while reducing the number of fittings in the system and the associated pressure drop.

Figure 8:
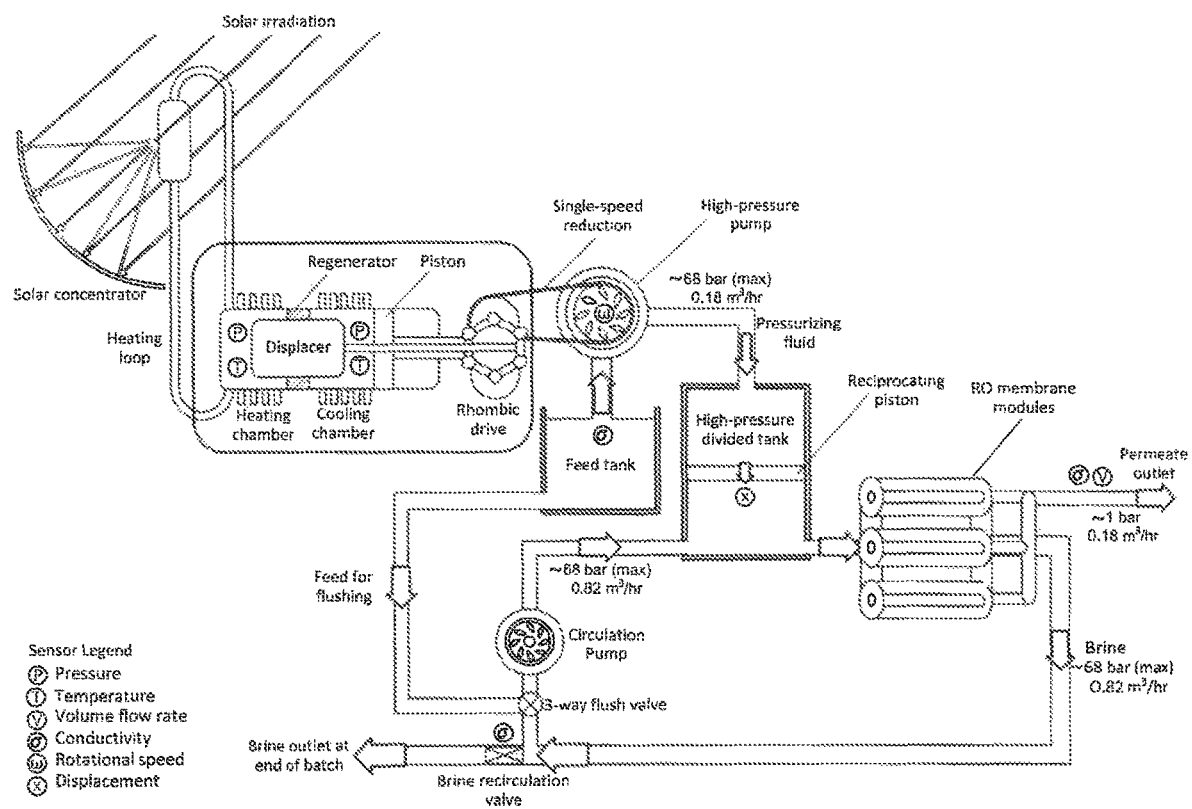
FIG. 8 a batch RO system of FIG. 3A and having a Stirling engine power source for energizing the high-pressure pump.

In one embodiment, the batch reverse osmosis assembly includes a thermal to mechanical energy transduction engine, such as a Stirling engine, to directly power the high-pressure pump (see FIG. 8).

Figure 9:
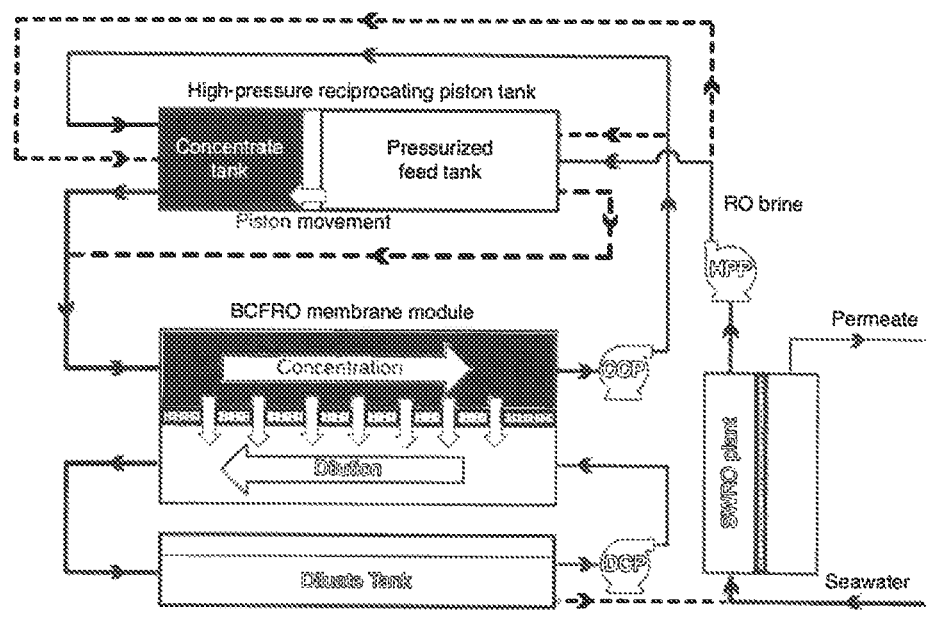
FIG. 9 schematically illustrates a batch counter flow reverse osmosis system of the present novel technology using a reciprocating high-pressure tank.

The above-described batch reverse osmosis system may be taken one step further to accommodate desalinization of highly concentrated brine, such as is produced by reverse osmosis of seawater. In known prior art systems, such an endeavor is difficult because the pressures necessary to overcome the osmotic pressure of the highly concentrated brine are often in excess of the failure limits of the osmotic membrane, resulting in eventual, or immediate, catastrophic failure of the membrane when attempted. One way to avoid such failure of the membrane is to have saline on both sides of the membrane to reduce the osmotic potential and thus require less pressure to overcome the same. As shown in FIG. 9, the instant assembly may be adapted as a batch counter-flow reverse osmosis (BCFRO) assembly wherein the brine (concentrate) and the resultant relatively desalinated permeate (diluate) are individually and continuously recirculated through the membrane module. Batch processes involve storing the feed and brine in tanks, wherein those tanks may be pressurized or maintained at ambient pressure. This is in contrast to steady state processes, where there is a continuous inflow of feed and removal of brine and permeate. BCFRO achieves batch operation, ramping up pressure over time, via a high-pressure reciprocating piston tank which houses the feed on one side and the recirculating concentrate on the other. Making the process a closed system also eliminates the need for an energy recovery device (ERD). The continuous recirculation ensures that the concentrate salinity increases gradually with time. Likewise, the process also has a tank for the recirculating diluate, which ensures a gradual decrease in salinity for the same. However, this tank is initially empty and is an unpressurized tank.

The high-pressure piston tank and the membrane module are initially filled with high salinity feed. Feed entering on the other side of the piston tank is pressurized by a high-pressure pump (HPP). In some embodiments, the high-pressure pump maybe powered by a Stirling engine, which converts solar thermal energy into mechanical work. This pressurized feed enters the high-pressure piston tank, pressurizes the concentrate, and forces it into the membrane module, initiating permeation. The concentrate salinity increases, then recirculates to the concentrate tank and mixes with the remaining concentrate before cycling. The diluate salinity decreases due to water influx. The new diluate leaves the membrane module, enters the initially empty diluate mixing tank, then recirculates to the membrane module. The concentrate and diluate continue recirculating on their respective sides of the membrane until terminal conditions are reached. When the cycle ends, feed water flushes remaining concentrate into the reject water tank. Later BCFRO phases are identical to this phase. The system allows for a downtime that may be lower than 10% of the permeate production time because the system does not have to be recharge after each cycle. The flushing step does not substantially increase the energy consumption because the system is depressurized. Because the system is closed during operation, depressurizing has negligible energy losses.

BCFRO typically operates as follows. At the beginning of a BCFRO cycle, the feed fills both sides of the membrane module (middle) and the concentrate side of the piston tank (top-left). High-pressure feed then fills up the feed side of the piston tank (top-right) and pressurizes the concentrate side in turn. This initiates the cycle and causes permeation across the membrane. The recirculating concentrate loses water and increases in salinity while the opposite happens on the diluate side. The concentrated and diluted streams are then routed to their respective tanks, where they mix with their respective stagnant volumes (top and bottom). This decreases the change in salinity experienced by the streams inside the membrane module. The recirculating streams with their altered salinities then re-enter the membrane module and the process continues until the desired terminal salinities are reached, marking the end of one cycle.

Batch operation is achieved by using a variable displacement, reciprocating piston tank (top), while counterflow RO is achieved with a RO module 200 having an osmotic membrane 270 (center) with concentrate (top side chamber 275) and diluate (bottom side chamber 280) streams flowing in counterflow. The diluate in the diluate tank 285 (bottom) is fed to a seawater RO plant (bottom right) for recovery of pure permeate. The shading gradients are indicative of salinity with darker shades representing higher salinities. The solid arrows represent fluid flow path during the first half of the cycle while the dashed lines represent the same during the second half. During the first half, RO brine effluent from the seawater RO plant is pressurized and stored on one side of the tank, simultaneously causing permeation in the BCFRO membrane module due to piston movement. After reaching the target recovery, the concentrate volume and the membrane module are washed off. It is followed by the second half of the cycle in which the other side of the tank is pressurized with fresh RO brine while the previously stored RO brine is introduced on both sides of the membrane module. In between cycles, the concentrate and diluate are rejected, and the membrane module is recharged with fresh feed.

The terminal diluate salinity for a BCFRO system handling seawater RO brine as the feed would usually be targeted around seawater salinity. This allows the diluate at the end of a cycle to be fed back to the seawater RO system to increase the overall recovery. The terminal salinity of the concentrated stream k dictated by the membrane flux and the burst pressure of the BCFRO membrane. However, the terminal salinities are interdependent and depend implicitly on the operating parameters, which makes the system design an iterative process.

Example

In one embodiment, assembly 100 for reverse osmotically desalinating water includes a source 105 containing feed water or like fluid to be desalinated and a high-pressure tank 110 having a first portion 115 and a second portion 120 and a movable piston wall 125 operationally connected therebetween A first portion inlet 130 is operationally connected to the first portion 115 and a second portion inlet 135 is operationally connected to the second portion 120. Likewise, a first portion outlet 140 is operationally connected to the first portion 115 and a second portion outlet 145 is operationally connected to the second portion 120. A valve 150 having a first inlet 155 and a second inlet 160 is connected to the tank 110 via a first outlet 165 in fluidic communication with the first portion inlet 130 and a second outlet 170 in fluidic communication with the second portion inlet 135. A high-pressure pump 175 is operationally connected to the source 105 and to the first valve inlet 155. Another valve 180 is operationally connected in the system 100 having a first inlet 185 in fluidic communication with the first portion outlet 140 and a second inlet 190 in fluidic communication with the second portion outlet 145 and a second valve outlet 195.

At least one reverse osmosis module 200 is operationally connected in the system 100, wherein the module 200 has at least one inlet 205 connected in fluidic communication with the second valve outlet 195 and at least one brine outlet 210 and at least one desalinated water or permeate outlet 215. The at least one brine outlet 210 is typically connected to one or more brine storage tanks 211 (typically maintained at ambient pressure), which may be operationally connected to the valve 150 for reintroduction of brine into the tank 110. In some embodiments, the one or more storage tanks 211 are multiple storage tanks 211, each for holding brine of a different concentration. The brine of one cycle maybe reintroduced to the system 100 as the feed or a feed component of another subsequent cycle. Likewise, the permeate outlet 215 may is typically operationally connected to a permeate tank 217 (likewise typically maintained at ambient pressure) for storage of permeate.

The system 100 further includes a circulation pump 220 having an inlet port 225 connected in fluidic communication with the brine outlet 210 and an outlet 230 connected in fluidic communication with the valve inlet 160. An electronic controller 240 is operationally connected to the first valve 150, to the second valve 180, to the high-pressure pump 175, and to the circulation pump 220. The electronic controller 240 is likewise typically connected to various sensors 250 positioned to measure flow rates, pH, temperature, conductivity, and pressure at various points in the system 100.

It should be recognized that although the example given above specific relates to salt water and/or saline solution that is treated to desalinate the water (removing pure water from saline solution to leave behind a more concentrated saline or brine), the method and apparatus discussed herein may be applied to other fluids as well by varying the pressure required to overcome the osmotic pressure of the fluid to be treated and by choosing the appropriate membrane material.

In operation saltwater is desalinated by first identifying a generally cylindrical tank having a first side, a second side, and a piston wall positioned therebetween, and then pumping feed water into a first side and pumping pressurized fluid into the second side. The pressurized fluid is typically selected from the group comprising feed water, brine, and combinations thereof. Next, the contents of the first side are directed through at least one reverse osmosis module to yield desalinated water and brine. Desalinated water from the at least one reverse osmosis module is directed to a desired recovery location and brine is directed from the at least one reverse osmosis module to a circulation pump. Feed water is pumped into the second side and brine is directed from the circulation pump to tank. Pressurized fluid is pumped into the first side, wherein the pressurized fluid is selected from the group comprising feed water, brine, and combinations thereof. The steps are repeated until the permeate product has a desired and predetermined salinity.

Pumping is typically controlled by an electronic controller programed to maintain a redetermined transmembrane water flux range. In some embodiments, the high-pressure pump is energized through the direct transduction of heat into kinetic energy.

In some embodiments, atmospheric pressure tanks are employed to store brine after a given number of strokes, so that the brine can then be reintroduced to the system as feed. This is similar to multi-staging and can be used to improve the overall recovery of the system. Using such multi-use approaches, one single system for batch counterflow reverse osmosis can achieve higher recoveries. Simply, the brine of one step becomes the feed of a subsequent step. Tanks that store brine of particular outlet steps can be used. Each tank has an inlet and outlet, and are switched between using valves.

The recovery ratio reached in the system may be varied using one if the following alternatives. First, changing the stroke length of the piston. For instance, by an extra intermediate end cap, that deactivates part of the piston volume. This internal end cap, which is surrounded by liquid on one side and an inactive filler on the other, reduces the piston volume. It could then be moved later, to increase the volume. The inactive filler could be a liquid. Said liquid could be added or removed with a pump, then a valve could lock it in place.

Alternately, a bypass channel with extra volume in the system that can be taken in or out of operation. By using this additional volume, the recovery ratio in the system can be changed while still getting the piston all the way to the end of the cylinder after each cycle and avoiding mixing within cycles. Valves at the entrance and/or exit of this bypass channel will enable or disable it.

While the novel technology has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the novel technology are desired to be protected.

What is claimed is:

1. An assembly for reverse osmotically desalinating water, comprising:
   a source containing feed water to be desalinated;
   a high-pressure tank having a first portion and a second portion and a movable piston wall operationally connected therebetween;
   a first portion inlet operationally connected to the first portion and a second portion inlet operationally connected to the second portion;
   a first portion outlet operationally connected to the first portion and a second portion outlet operationally connected to the second portion;
   a first valve having a first first valve inlet, a second first valve inlet, a first first valve outlet in fluidic communication with the first portion inlet and a second first valve outlet in fluidic communication with the second portion inlet;
   a high-pressure pump operationally connected to the source and to the first first valve inlet;
   a second valve having a first second valve inlet in fluidic communication with the portion outlet and a second second valve inlet in fluidic communication with the second portion outlet and a second valve outlet;
   at least one reverse osmosis module having at least one reverse osmosis module inlet connected in fluidic communication with the second valve outlet, at least one brine outlet and at least one desalinated water outlet;
   a circulation pump having a circulation pump inlet port connected in fluidic communication with the brine outlet and a circulation pump outlet connected in fluidic communication with the second first valve inlet; and
   an electronic controller operationally connected to the first valve, to the second valve, to the high-pressure pump and to the circulation pump.

2. The assembly of claim 1 and further comprising a plurality of sensors operationally connected to the electronic controller and positioned to provide control feedback.

3. The assembly of claim 2 wherein the plurality of sensors is selected from the group comprising pressure sensors, flow rate sensors, pH sensors, and conductivity sensors.

4. The assembly of claim 1 and further comprising: a power source operationally connected to the high-pressure pump.

5. The assembly of claim 4 wherein the power source is a Stirling engine.

6. The assembly of claim 1 wherein the electronic controller is programmed to calculate transmembrane water flux using the equation $$\frac{\partial C_i(y)}{\partial t} + J_w \frac{\partial C_i(y)}{\partial y} = D_{eff} \frac{\partial^2 C_i(y)}{\partial y^2}.$$

7. The assembly of claim 1 wherein the reverse osmosis module includes at least one high salinity chamber and at least one permeate chamber separated by an osmotic membrane; a high salinity chamber inlet port operationally connected to the at least one high salinity chamber; a high salinity chamber outlet port operationally connected to the at least one high salinity chamber; a permeate chamber inlet port operationally connected to the at least one permeate chamber; a permeate chamber outlet port operationally connected to the at least one permeate chamber; and a permeate tank connected in fluidic communication to the permeate chamber outlet port.

8. The assembly of claim 7 wherein the source of feed water to be desalinated is a reverse osmosis desalination system; wherein both the at least one high salinity chamber and the at least one permeate chamber contain saltwater; and wherein the saltwater contained in the at least one high salinity chamber has a greater salinity than the saltwater contained in the at least one permeate chamber.

9. The assembly of claim 8 wherein during cyclic operation, feed for the next cycle fills one of the first portion or second portion as working fluid to push against the movable piston wall while the contents of the other of the first portion or the second portion experience salinity concentration and a volume decrease.

10. The assembly of claim 1 wherein the brine outlet is connected in fluidic communication to a brine storage tank; and wherein the brine storage tank is connected in fluidic communication to the first and second portion inlets.

* * * * *